United States Patent [19]

Loper, III

[11] Patent Number: 5,203,563

[45] Date of Patent: Apr. 20, 1993

[54] SHAKER CONTROL DEVICE

[75] Inventor: Milton H. Loper, III, Mountain View, Calif.

[73] Assignee: Atari Games Corporation, Milpitas, Calif.

[21] Appl. No.: 674,076

[22] Filed: Mar. 21, 1991

[51] Int. Cl.$^5$ .............................................. A63B 71/04
[52] U.S. Cl. .................................. 273/148 B; 434/45; 434/62; 434/69; 273/442
[58] Field of Search ............... 273/148 B, 86 B, 86 E, 273/86 H, 442; 434/45, 61, 71, 62–66, 68, 69, 46, 49

[56] References Cited

U.S. PATENT DOCUMENTS

| | | |
|---|---|---|
| 4,262,549 | 4/1981 | Schwellenbach . |
| 4,291,490 | 9/1981 | Ikeda .............................. 273/86 EX |
| 4,713,007 | 12/1987 | Alban ..................................... 434/45 |
| 4,940,234 | 7/1990 | Ishida et al. ........................ 273/442 |
| 5,044,956 | 9/1991 | Behensky et al. .................... 434/71 |

FOREIGN PATENT DOCUMENTS 0379393 7/1990 European Pat. Off. .
2525501 10/1983 France ................................ 434/62

OTHER PUBLICATIONS

CiscoHeat Brochure by Jaleco Ltd., dated (1990).

Primary Examiner—V. Millin
Assistant Examiner—Raleigh W. Chiu
Attorney, Agent, or Firm—Knobbe, Martens, Olson & Bear

[57] ABSTRACT

A device for causing the steering wheel of a video-based vehicle simulator to selectively vibrate during predetermined periods of the video sequence includes a frame which is rigidly attached to the steering wheel. A cylindrical electrical motor is mounted on the frame, and a first shaft is attached to one base of the motor and extends outwardly from the motor. Also, a second shaft is attached to and extends outwardly from the other base of the motor, and the second shaft is coaxial with the first shaft. The two shafts can be rotated by the rotor of the motor. Each shaft has a weight attached to the shaft. These weights are attached to their respective shafts radially asymmetrically with respect to the axis of the shafts. One weight is attached to its shaft on one side of the axis of the shafts, and the other weight is attached to its shaft on the side of the axis which is opposite from the first weight. A microprocessor is electrically connected to the motor to selectively energize the motor during predetermined periods of the game sequence. When the motor is energized, the rotation of the weights causes the motor to vibrate. The vibration of the motor is transferred through the frame to the steering wheel.

11 Claims, 2 Drawing Sheets

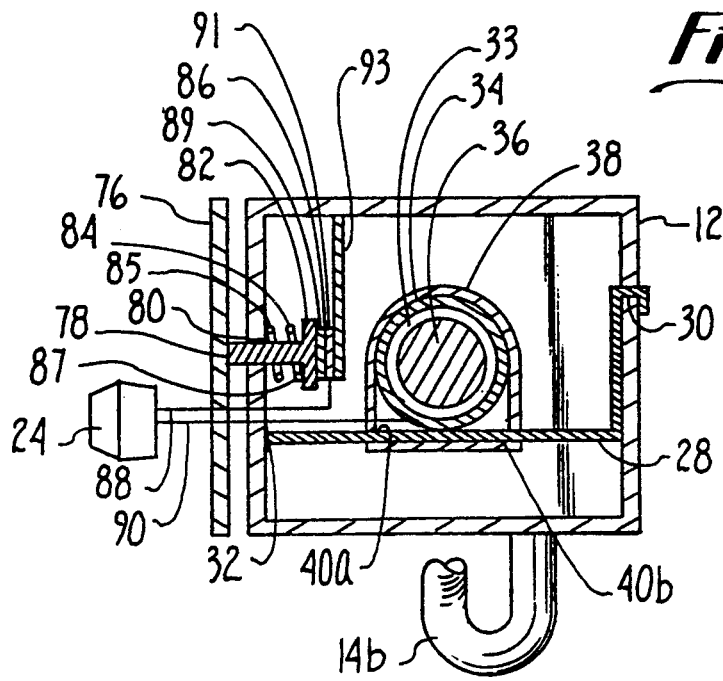
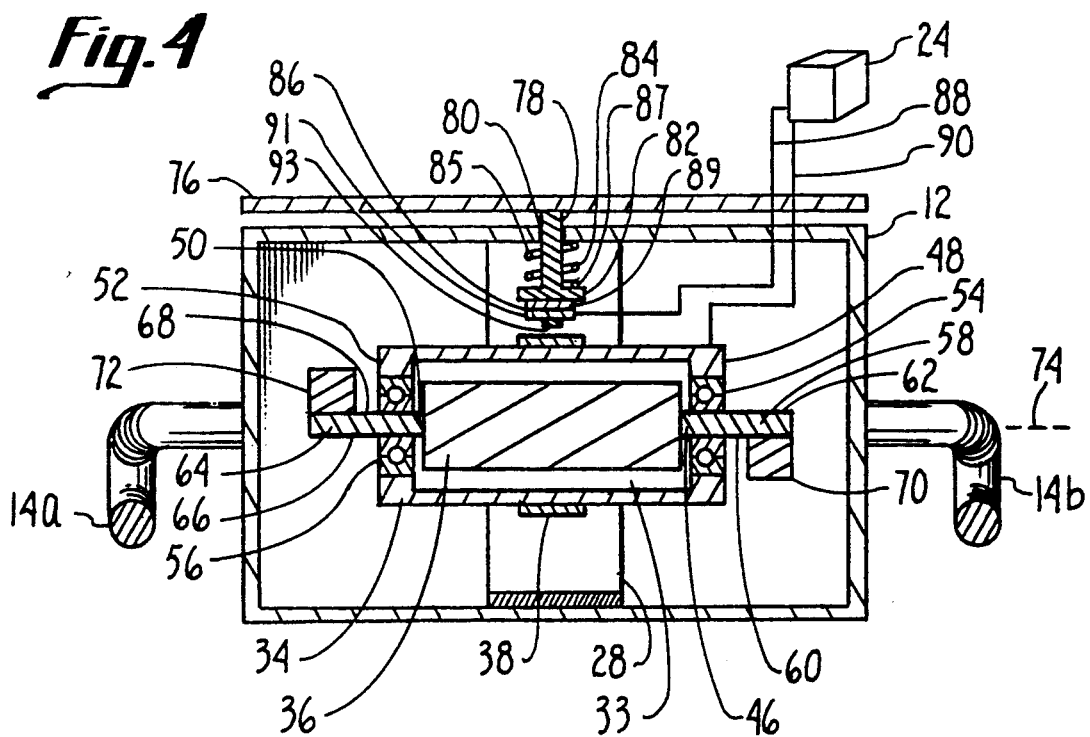

SHAKER CONTROL DEVICE

FIELD OF THE INVENTION

The present invention relates generally to vehicle simulators. More particularly, the present invention relates to interactive simulation devices which generate video images based upon the orientation of a steering wheel that is operatively engaged with the device. The present invention is particularly, though not exclusively, useful for generating vibrations in the steering wheel of a vehicle simulator.

BACKGROUND

The use of video arcade games which simulate the operation of vehicles, such as race cars and aircraft, for entertainment is becoming widespread. Also, apparatus which simulate the operation of vehicles are increasingly being used as training devices for government and industry vehicle operators. Such apparatus can be programmed to realistically simulate the motion of a vehicle through two or three-dimensional space, and can also provide relatively realistic simulation of the control of the vehicle. Importantly, it is safer for a person to be entertained or trained on a video simulator, as compared with a real vehicle, because simulators are not susceptible to actual crashes.

Typically, a vehicle simulator has a computer which displays on a monitor a constantly changing video picture of a simulated three dimensional space. The "view" presented on the monitor is ordinarily the view of the simulated space as would be seen from the driver's seat of the simulated vehicle. Thus, as the simulated vehicle "moves" through the simulated space, the video display is constantly updated by the computer to model the motion of the vehicle. Preferably, the computer realistically models the simulated space by including in the space rough terrain or inhospitable airspace, as appropriate.

Whether the vehicle being simulated is an aircraft, spaceship, tank, motorcycle, ship, or an automobile, and whether the simulation is for entertainment or training purposes, it is typically the case that the operator controls the simulated vehicle by manipulating a steering wheel or handle. Consequently, to more realistically model the behavior of the vehicle as it negotiates rough terrain or airspace, it is desirable for the steering wheel or handle to vibrate during periods of the video sequence which simulate passage through the rough territory. The present invention recognizes that it is possible to provide a shaker control device for selectively vibrating the steering wheel of a vehicle simulation apparatus, to model behavior of the simulated vehicle as it negotiates rough terrain or airspace.

Accordingly, it is an object of the present invention to provide a device for selectively vibrating the steering wheel of a vehicle simulator to model the behavior of the simulated vehicle as it passes over rough terrain or airspace. It is another object of the present invention to provide a device for selectively vibrating the steering wheel of a vehicle simulator which is relatively simple and reliable in operation. A further object of the present invention is to provide a device for selectively vibrating the steering wheel of a vehicle simulator which is easy and cost-effective to manufacture.

SUMMARY OF THE INVENTION

A shaker control device for causing the steering wheel of a video-based vehicle simulator to vibrate during predetermined periods of the video sequence includes a frame which is rigidly attached to the steering wheel. A motor is in turn rigidly attached to the frame. More specifically, the motor has a rotor and a cylindrical casing, and the casing of the motor is rigidly attached to the frame.

To cause the motor to vibrate when energized, two shafts are connected to the rotor of the motor, and each shaft is rotationally unbalanced. More particularly, a first shaft is attached to the rotor and has an end segment that extends outwardly from one base of the motor casing. The first shaft is coaxial with the rotor of the motor. Furthermore, a second shaft is attached to the rotor and has an end segment that extends outwardly from the base of the motor which is opposite from the first shaft. This second shaft is also coaxial with the rotor and, hence, is coaxial with the first shaft.

The end segments of the shafts each have a first side and a second side. A first weight is attached to the first side of the first end segment, and a second weight is attached to the second side of the second end segment. Thus, each of the weights is attached to its respective end segment radially asymmetrically with respect to the axis of the shafts, to rotationally unbalance the shafts.

Stated differently, each weight is attached to its respective end segment with the center of mass of each weight distanced from the axis of the shafts. In accordance with the present invention, the center of mass of one weight is oriented oppositely from the center of mass of the other weight, with respect to the axis of the shafts. Consequently, when the motor is energized, the effect of the weights causes the motor to vibrate, and the vibration of the motor is transferred through the frame to the steering wheel.

In a preferred embodiment, a microprocessor is electrically connected to the motor to selectively energize the motor during predetermined periods of the sequence of game play. For example, in a video game which simulates the driving of a race car, the microprocessor can energize the motor to cause the steering wheel to vibrate when the operator of the game "drives" the race car over rough terrain.

Further details of the structure of the invention, as well as the operation of the invention, can best be appreciated with reference to the drawings, in which like numbers refer to like components, and in which:

FIG. 3 is a cross-sectional view of the novel shaker control device of the present invention, as seen along the line 3—3 in FIG. 2; and FIG. 4 is a cross-sectional view of the novel shaker control device of the present invention, as seen along the line 4—4 in FIG. 2, schematically showing the microprocessor.

DESCRIPTION OF THE PREFERRED EMBODIMENT

Figure 1:
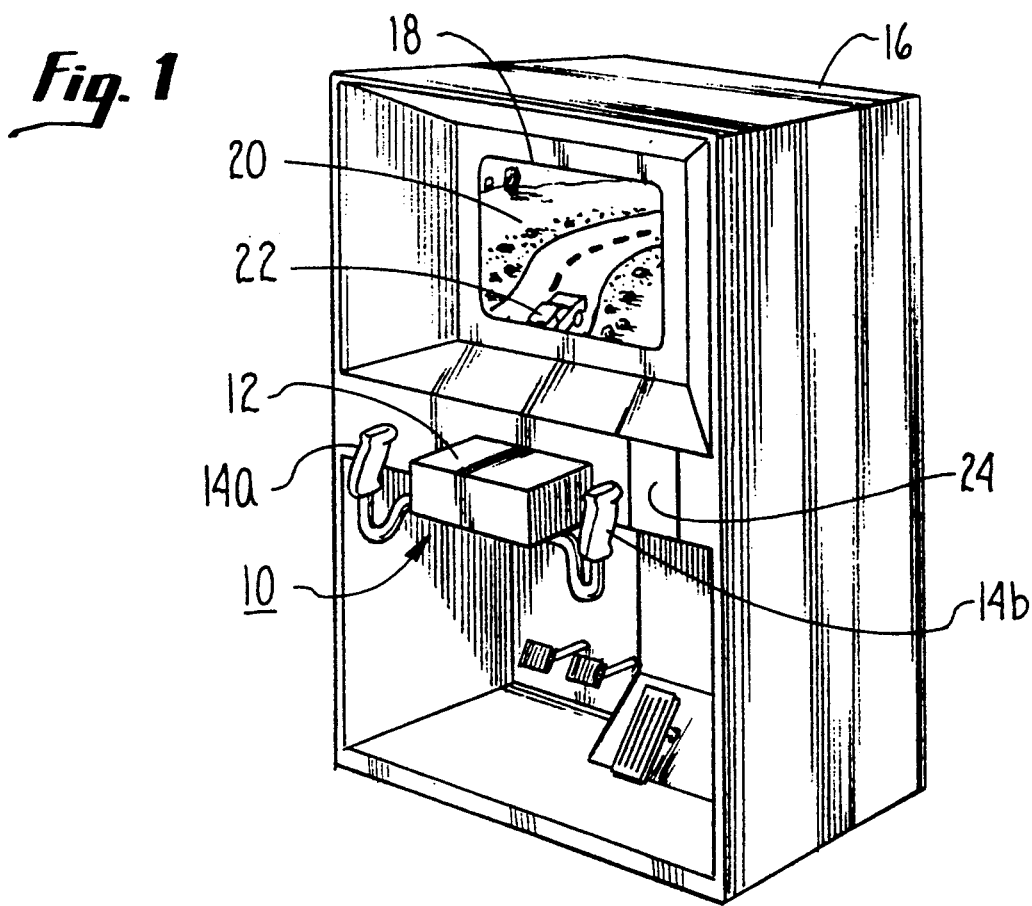
FIG. 1 is a perspective view of the novel shaker control device of the present invention, seen in one intended environment.

Referring initially to FIG. 1, a shaker control device is shown, generally designated 10. As shown, the device 10 includes a metal frame 12 which is rigidly attached to the steering handles 14a, 14b of a video arcade game 16. The video game 16 has a video monitor 18 which displays a space 20 and an icon 22 which "moves" through the space 20. As shown in FIG. 1, the icon 22 represents the front end of the simulated vehicle being "driven" through the space 20. Thus, video simulator 10 displays the space 20 as would be seen from the simulated vehicle.

The motion of the icon 22 through the space 20 is controlled by a microprocessor 24 in response to the manipulation of the orientation of the handles 14a, 14b by an operator (not shown). While the video game 16 shown in FIG. 1 simulates the motion of a terrestrial vehicle through the space 20, (i.e., icon 22 represents an automobile or other wheeled vehicle,) it is to be understood that video game 16 can alternatively simulate the motion of an aircraft, boat, submarine, spaceship, tank, or sailing vessel (not shown) through the space 20.

Figure 2:
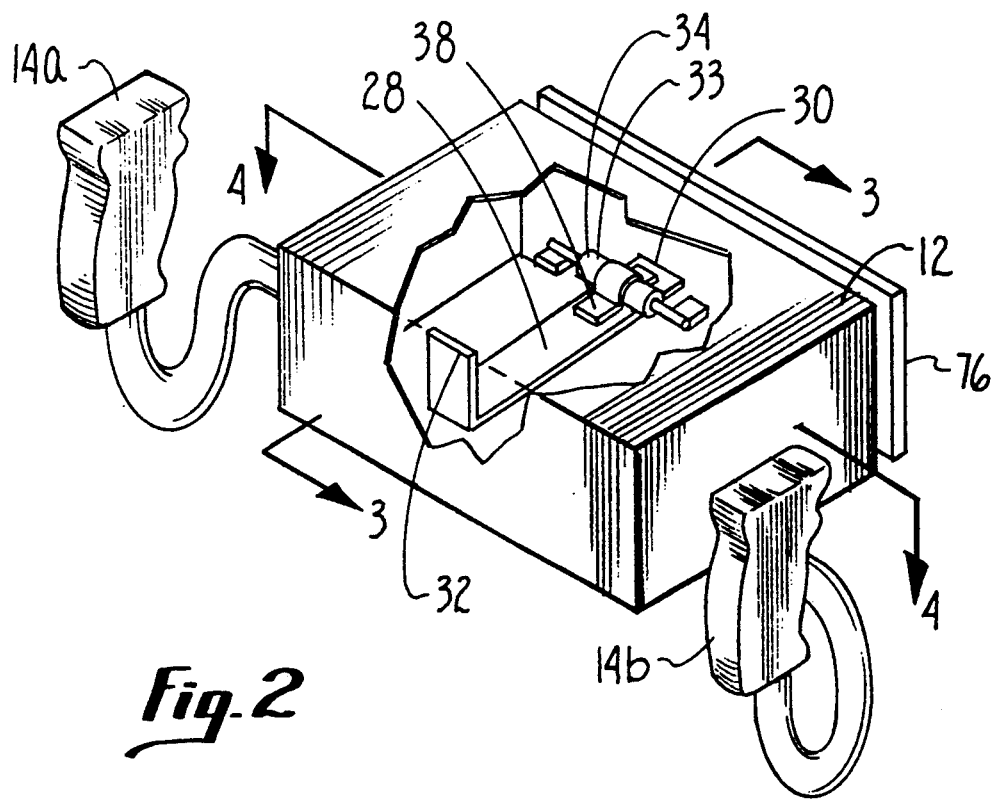
FIG. 2 is an isometric view of the novel shaker control device of the present invention schematically showing the microprocessor with portions of the frame shown in phantom or cut away for clarity.

The details of the shaker control device 10 can best be seen in cross-reference to FIGS. 2, 3, and 4. FIG. 2 shows that a metal bracket 28 is rigidly attached to the frame 12, e.g., by welding bracket 28 to frame 12 at weld sites 30, 32. Alternatively, bracket 28 can be formed integrally with frame 12. As further shown in FIG. 2, a variable speed electric motor 33, which includes a cylindrical metal or plastic casing 34 and a rotor 36 (shown in FIG. 3), is mounted on the bracket 28. As best shown in cross-reference to FIGS. 2 and 3, the motor casing 34 is held onto bracket 28 by a metal strap 38. More specifically, portions of the metal strap 38 are advanced around the motor casing 34 and through holes 40a, 40b which are formed in the bracket 28, as shown in FIG. 3, and the ends 42, 44 of the strap 38 are fastened together. It will be appreciated by the skilled artisan that the motor casing 34 can be held onto the bracket 28 by alternative means, such as by welding the motor casing 34 to the bracket 28.

FIG. 4 shows that a first metal shaft 46 is attached to the rotor 36 and extends outwardly from a base 48 of the motor casing 34. Furthermore, FIG. 4 shows that a second metal shaft 50 is attached to the rotor 36 and extends outwardly from a base 52 of the motor casing 34. Thus, the first shaft 46 extends outwardly from the motor casing 34 in a direction that is opposite from the direction in which the second shaft 50 extends outwardly from the motor casing 34. As can be appreciated in reference to FIG. 4, the shaft 46 is coaxial with the shaft 50 and the rotor 36. Moreover, FIG. 4 shows that the first shaft 46 is radially supported by a bearing 54, and the second shaft 50 is radially supported by a bearing 56. Preferably, the bearings 54, 56 are ball bearings or metal bushings.

Still referring to FIG. 4, the shafts 46, 50 are shown to be rotationally unbalanced. More specifically, the first shaft 46 has an end segment 58 which extends outwardly from the motor casing 36. As shown, the end segment 58 of the first shaft 46 has a first side 60 and a second side 62. Similarly, the second shaft 50 has an end segment 64 that extends outwardly from the motor casing 36, and the end segment 64 has a first side 66 and a second side 68. As shown in FIG. 4, a first weight 70 is attached to the first side 60 of the end segment 58 of the first shaft 46. Moreover, a second weight 72 is attached to the second side 68 of the end segment 64 of the second shaft 50.

Accordingly, each of the weights 70, 72 is disposed on its respective shaft radially asymmetrically with the common axis 74 of the shafts 46, 50. Stated differently, the center of mass of each weight 70, 72 is distanced from the axis 74. Furthermore, in the preferred embodiment, the weights 70, 72 are positioned on opposite sides of the axis 74 from each other.

FIGS. 3 and 4 also show that the frame 12 is rotatably attached to a metal plate 76. More particularly, as seen best in FIGS. 3 and 4, a rod 78 is fixedly attached to the plate 76 and extends through an aperture 80 which is formed in the frame 12. The rod 78 includes an abutment 82, and a spring 84 is positioned between the abutment 82 and the frame 12 to bias the frame 12 to the neutral position of the frame 12 relative to the plate 76. In other words, the frame 12 is urged to its neutral position relative to the plate 76 by the spring 84, as shown in FIGS. 3 and 4. More specifically, a first end 85 of the spring 84 is attached to the plate 76, and a second end 87 of the spring 84 is attached to the abutment 82 with the spring 84 in tension. Consequently, the spring 84 both biases the frame 12 to its neutral position and distances the frame 12 from the plate 76. In accordance with the present invention, the plate 76 is fixedly attached to the video game 16, shown in FIG. 1.

To sense the orientation of the frame 12 relative to the plate 76, a potentiometer 86 is operatively engaged with the rod 78. The potentiometer 86 outputs an electrical signal which is representative of the orientation of the frame 12 (and, hence, the handles 14a, 14b) relative to the plate 76, and sends this signal to the microprocessor 24 via an electrical line 88. More particularly, a side 89 of the potentiometer 80 is fixedly attached to the abutment 82, and a side 91 of the potentiometer 86 is fixedly attached to a post 92. The post 92 is in turn fixedly attached to the frame 12. The skilled artisan will appreciate that the sides 91, 89 of the potentiometer 86 can rotate relative to each other and the potentiometer 86 can consequently output an electrical signal representative of such rotation. Additionally, FIGS. 3 and 4 show that the microprocessor 24 is electrically connected to the motor 33 via an electrical line 90, for selectively energizing the motor 33.

It is to be understood that while the embodiment of the device 10 which is shown has two weights 70, 72, the weight 72 may be eliminated, and the device 10 will still function as intended to vibrate the steering handles 14a, 14b with a single weight 70. In such an embodiment, the bearing 54 is preferably a high-wear bearing suitable for absorbing the relatively high frictional forces which the shaft 46 will impose on the bearing 54 when only a single weight 70 is incorporated into the device 10.

OPERATION

In its operation, the motor 33 of the device 10 is selectively energized as appropriate during the conduct of the video game that is presented on the monitor 18. More specifically, the operator 26 of the video arcade game 16 can manipulate the handles 14a, 14b to cause the icon 22 to pass through simulated rough terrain. When the icon 22 passes through the simulated rough terrain, the microprocessor 24 energizes the motor 33, which causes the shafts 46, 50 with their associated weights 70, 72 to rotate. As the shafts 46, 50 rotate, the effect of the weights 70, 72 causes the shafts 46, 50 to vibrate. This vibration is transferred through the motor casing 34, the bracket 28, and the frame 12, to the handles 14a, 14b.

Accordingly, when microprocessor 24 energizes the motor 33, the handles 14a, 14b are caused to vibrate. Furthermore, the microprocessor 34 can selectively establish the speed of rotation of the rotor 36. Specifically, the microprocessor 24 establishes the speed of rotation of the rotor 36 to control the amplitude of the vibrations of the handles 14a, 14b as appropriate for the nature of the rough terrain being simulated on the monitor 18. Upon passage of the icon 22 out of the simulated rough terrain and onto smoother "ground", the microprocessor 24 de-energizes the motor 33 to stop the vibrations of the handles 14a, 14b.

While the particular shaker motor as herein shown and described in detail is useful for its intended purpose, it is to be understood that the scope of the present is not intended to be limited by anything other than the structure recited in the appended claims.

I claim:

1. A device for generating simulated environmentally caused vibrations in a steering wheel, which comprises:
   a steering wheel;
   a frame attached to the steering wheel;
   an electric motor mounted on said frame, said motor having a rotor;
   an electrical circuit for driving the motor when the vibration is to be simulated;
   a first shaft connected to said rotor so as to be rotationally driven by said motor; and
   a first weight disposed on said first shaft in a radially asymmetric configuration with respect to the longitudinal axis of the shaft so that the asymmetric weight configuration vibrates the shaft when the shaft is rotationally driven by the motor to thereby simulate environmentally caused vibrations in said steering wheel.

2. The device recited in claim 1, further comprising a second shaft connected to said rotor, said second shaft extending outwardly from said rotor opposite said first shaft, said first shaft being coaxial with said second shaft, said device further comprising a second weight disposed on said second shaft in a radially asymmetric configuration with respect to said longitudinal axis.

3. The device recited in claim 2, wherein each of said shafts has a first side and an opposing second side, said first weight being attached to said first side of said first shaft and said second weight being attached to said second side of said second shaft.

4. The device recited in claim 1, wherein the electrical circuit comprises a microprocessor electrically connected to said motor for selectively energizing said motor to selectively generate vibrations of the steering wheel.

5. The device recited in claim 4, further comprising a video display apparatus operatively engaged with the steering wheel so as to generate a sequence of video displays in response to the orientation of the steering wheel, said microprocessor energizing said motor to vibrate the steering wheel during predetermined periods of the sequence of video displays.

6. A device for generating simulated environmentally caused vibrations in a steering wheel, comprising:
   a steering wheel;
   an electrical motor having a rotor;
   an electrical circuit for driving the motor when vibration is to be simulated;
   a first vibration shaft mechanically connected to the steering wheel and to said rotor so as to be rotationally driven by said motor; and
   a weight having a center of mass, said weight being attached to said vibration shaft with said center of mass distanced from the longitudinal axis of the shaft so as to vibrate the shaft when said shaft is rotationally driven by the motor and thereby simulate environmentally caused vibrations in said steering wheel.

7. The device recited in claim 6, wherein said motor includes a casing, said device further comprising a source of electricity electrically connected to said motor and a frame connected to the steering wheel, said casing being connected to said frame.

8. The device recited in claim 7, further comprising a second vibration shaft connected to said rotor, said second shaft extending outwardly from said rotor opposite said first vibration shaft, said first vibration shaft being coaxial with said second shaft vibration, said device further comprising a second weight having a center of mass, said second weight being disposed on said second vibration shaft with said center of mass of said second vibration weight distanced from said longitudinal axis.

9. The device recited in claim 8, wherein each of said shafts vibration has a first side and an opposing second side, said first weight being attached to said first side of said first vibration shaft and said second weight being attached to said second side of said second vibration shaft.

10. The device recited in claim 6, wherein the electrical circuit comprises a microprocessor electrically connected to said motor for selectively energizing said motor to selectively generate vibrations of the steering wheel.

11. The device recited in claim 10, further comprising a video display apparatus operatively engaged with the steering wheel so as to generate a sequence of video displays in response to the orientation of the steering wheel, said microprocessor energizing said motor to vibrate the steering wheel during predetermined periods of the sequence.

* * * * *